United States Patent [19]

Hill

[11] Patent Number: 5,281,058
[45] Date of Patent: Jan. 25, 1994

[54] DOWELING TEMPLATE

[76] Inventor: Harvey C. Hill, 6770 Tory Way, Dublin, Calif. 94568

[21] Appl. No.: 15,553

[22] Filed: Feb. 9, 1993

[51] Int. Cl.$^5$ .............................................. B23B 47/28
[52] U.S. Cl. .................................. 408/115 R; 408/97
[58] Field of Search ................... 408/97, 103, 115 R; 144/144 R, 144.5 R

[56] References Cited

U.S. PATENT DOCUMENTS

| | | | |
|---|---|---|---|
| 2,260,784 | 10/1941 | Morton | 408/103 |
| 2,838,966 | 6/1958 | Campbell. | |
| 3,313,188 | 4/1967 | Abernethy | 408/97 |
| 4,145,160 | 3/1979 | Wiggins. | |
| 4,153,384 | 5/1979 | Isaken. | |
| 4,176,989 | 12/1979 | Wolff. | |
| 4,421,442 | 12/1983 | Lindblad. | |
| 4,474,514 | 10/1984 | Jensen. | |
| 4,594,032 | 6/1986 | Warburg | 408/115 R |
| 4,668,134 | 5/1987 | Vindez. | |
| 4,730,959 | 3/1988 | Aerni et al.. | |
| 4,740,117 | 4/1988 | Schaff et al.. | |
| 4,923,340 | 5/1990 | Hegedusch. | |
| 5,114,285 | 5/1992 | Brydon | 408/115 R |

FOREIGN PATENT DOCUMENTS

| | | | |
|---|---|---|---|
| 17949 | 10/1980 | European Pat. Off. | 408/115 R |
| 2215245 | 9/1989 | United Kingdom | 408/103 |

OTHER PUBLICATIONS

Wolfcraft-Dowel Quick Kit, Itasca, Ill.
Dowel Pro Kit No. 967189-sold by Sears.

Primary Examiner—Daniel W. Howell
Attorney, Agent, or Firm—Bielen, Peterson & Lampe

[57] ABSTRACT

A doweling template for accurately drilling holes in a work piece utilizing a structural member. The structural member includes first and second sets of parallel bores which are orthogonally oriented relative to one another. First and second guides align the first and second sets of parallel bores with the work piece, respectively. Each of the guides is removably fastened to planar sides of the work piece to permit usage of the doweling template in restricted work areas.

9 Claims, 2 Drawing Sheets

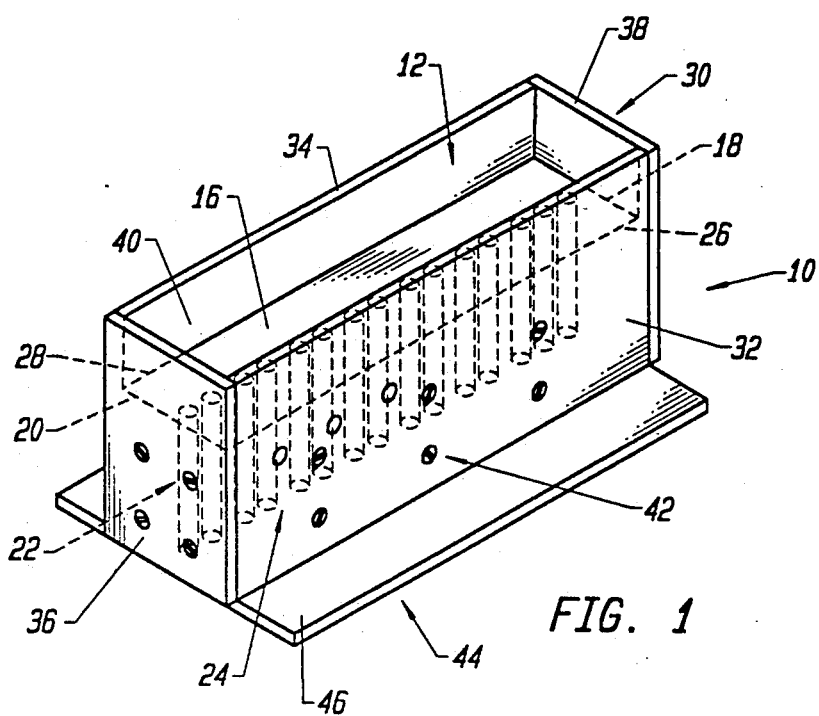
FIG. 1
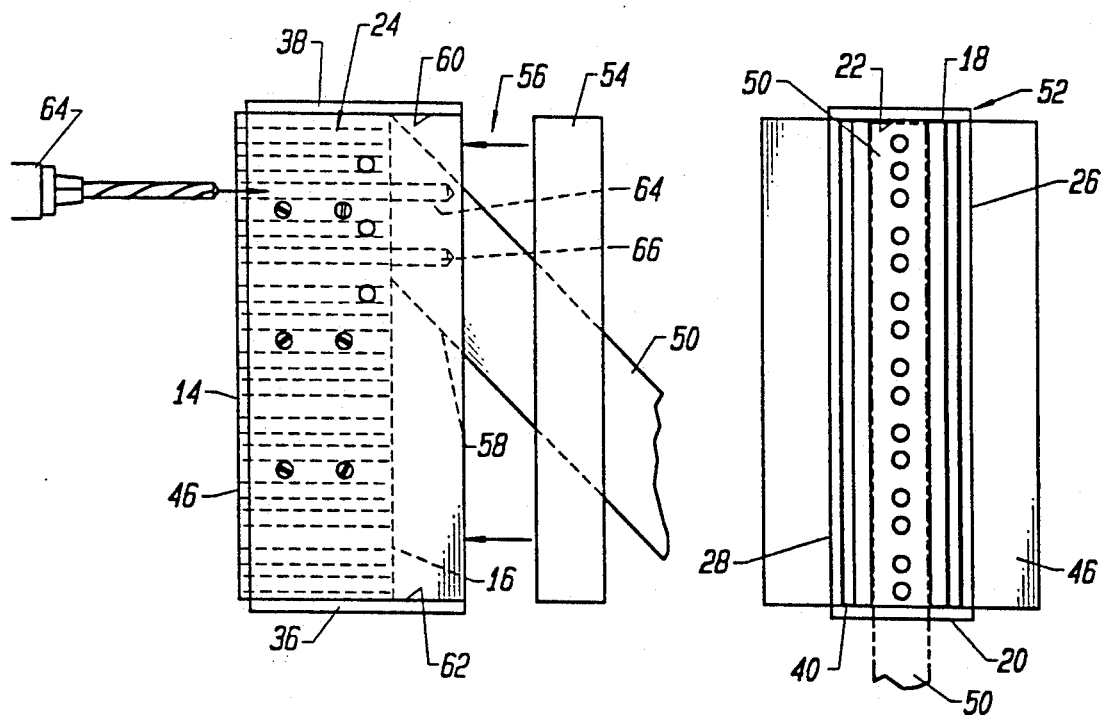
FIG. 2
FIG. 3

DOWELING TEMPLATE

BACKGROUND OF THE INVENTION

The present invention relates to a novel and useful doweling template.

To employ dowels in joining work pieces, extremely accurate apertures must be drilled such that the work piece accurately aligns with another similarly drilled work piece. It is known that dowels provide a superior joining of elements used in construction of items composed of wood, metal, plastic, and the like.

In the past, guides have been devised for the utilization of dowel-type joints. For example, a Dowel Pro Kit, number 967189 sold by Sears Roebuck & Co., Chicago Ill. and a Dowel Quick Kit sold by Wolfcratt Inc. or Itasca Ill. represent prior doweling aids. Unfortunately, such prior devices require clamps for use and lack versatility in drilling dowel recesses in different directions and with various sized work pieces.

U.S. Pat. Nos. 4,176,989, 4,730,959, 4,668,134 and 4,740,117 described doweling templates that are manually or mechanically guided to a certain position to drill openings in a single direction.

U.S. Pat. Nos. 2,838,966, 4,145,160, 4,153,384, and 4,421,442 describe doweling jigs or templates which use a variety of clamps to align the fittings which may be drilled in one direction.

U.S. Pat. Nos. 4,474,514 and 4,923,340 show doweling jigs which employ guides extending along side portions of a work piece. However, openings may only be drilled in one direction since only one set of guides are employed in such jigs.

A doweling template which is easy to use, is accurate, and is versatile would be notable advance in the construction industry.

SUMMARY OF THE INVENTION

In accordance with the present invention a novel and useful doweling template is herein described.

The doweling template of the present invention utilizes a structural member having a first set of parallel bores extending through the same. The first set of parallel bores represent various size openings corresponding to the recesses to be drilled in the work piece. The structural member may be externalize in a block-like element and be transparent or translucent in construction. The structural member would also include a second set of parallel bores which are orthogonally oriented relative to the first set of parallel bores. The second set of parallel bores would also possess a variety of opening diameters to accommodate different size drills corresponding to the eventual recesses placed in the work piece.

A first guide is also included in the present invention for aligning the work piece with the first set of parallel bores. The first guide may take the form of a quartet of flanges which are individually removably fastened to the structural member. In this regard, the structural member would possess planar, parallel sides to accommodate each of the pair of flanges. Such flanges may form an open chamber to accommodate a work piece. Shims may be used to firmly position the work piece within the chamber. This is important where work pieces vary in thickness.

A second guide is also included for aligning the work piece with the second set of parallel bores. In certain cases the second guide may include a plate which is fastened to a planar surface of the structural member, and is orthogonally oriented relative to the quartet of flanges of the first guide. In this manner, the second guide would permit the structural member to be moved and used on a less mobile work piece such as a house stud, a large piece of furniture, and the like. Again, the plate of the second guide means would be removably fixed to the structural member so as to permit the template of the present invention to used in restricted spaces. Also, the first and second guides may be constructed of transparent or translucent material. Such an embodiment allows the operator to clearly view the aperture drilling procedure.

It may be apparent that a novel and useful doweling template has been described.

It is therefore an object of the present invention to provide a doweling template which is portable, and extremely versatile in drilling doweling recesses in restricted spaces.

It is another object of the present invention to provide a doweling template which may be employed without the use of clamps or other holding implements.

A further object of the present invention is to provide a doweling template which is usable with a movable work piece or an inanimate work piece requiring doweling apertures.

The invention possesses other objects and advantages especially as concerns particular characteristics and features thereof which will become apparent as the specification continues.

BRIEF DESCRIPTION OF THE DRAWINGS

FIG. 1 is a bottom right perspective view of the template of the present invention depicting the first set of plurality of bores in phantom.

FIG. 2 is a side elevational view of the template of the present invention in use with a work piece, exemplar shim, and drill.

FIG. 3 is a bottom plan view of the template of the present invention with a work piece in place utilizing a multiplicity of shims.

For a better understanding of the invention reference is made to the following detailed description of the preferred embodiments thereof which will be referenced to the prior described drawings.

DESCRIPTION OF THE PREFERRED EMBODIMENTS

Various aspects of the present invention will evolve from the detailed description of the preferred embodiments thereof which should be taken with the drawings prior described.

Figure 5:
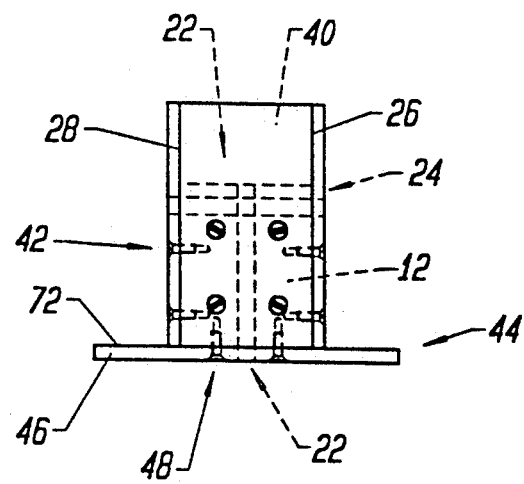
FIG. 5 is a end elevational view of the template of the present invention showing the first and second plurality of bores in phantom.

The invention as a whole is depicted in the drawings by reference character 10. The doweling template 10 includes as one of its elements a structural member 12 possessing a top surface 14, a bottom surface 16, and end surfaces 18 and 20. Structural member 12 may take the form of a rectangular solid block of translucent or transparent construction. In this regard, block 12 may be constructed of plastic, glass, or other crystalline material. Structural member 12 includes a first plurality of bores 22 which extend from top 14 to bottom 16, thereof. A second plurality of bores 24 extends between sides 26 and 28, best shown in FIGS. 1 and 5. First and second plurality of bores 22 and 24 are generally aligned along an axis and are spaced according to normally employed openings used in the process of doweling. Each of the bores within either the first or second plurality of bores, are parallel to one another, in this regard.

Template 10 also includes as one of its elements a first guide 30, including a first pair of parallel flanges 32 and 34 and a second pair of parallel flanges 36 and 38. First set of flanges 32 and 34 are generally orthogonally oriented relative to second pair of flanges 36 and 38. Flanges 32, 34, 36, and 38 form open chamber 40 which permits a work piece to contact bottom 16 of structural member 12, which will be more fully described hereinafter. It should be noted that flanges 32, 34, 36, and 38 are removably attached to structural member 12 by plurality of set screws 42.

Second guide 44 is also depicted in the drawings. Second guide 44 takes the form of plate 46 which is removably fastened to structural member 12 by a plurality of screws 48, FIG. 6. Flanges 32, 34, 36, and 38 as well plate 46 may be formed of transparent or translucent material, as is the case with structural member 12.

Further, where a work piece, such as work piece 50 FIGS. 2 and 3, is employed with template 10, a multiplicity of shims 52 may be used to center work piece 50 within open chamber 40 form by flanges 32, 34, 36, and 38. Shim 54, FIG. 2, is illustrated as moving toward open chamber 40 by directional arrows 56 as exemplar of show the operation of multiplicity of shims 52.

Figure 4:
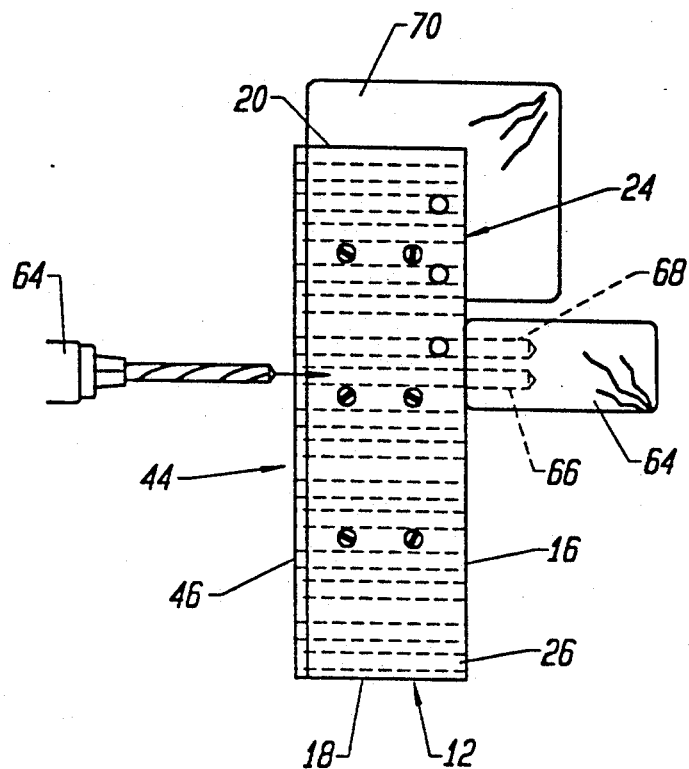
FIG. 4 is a side elevational view of the template of the present invention with the first guide means removed, in use with work pieces and a drill.

In operation, the user may employ template 10 to drill one or more apertures in a work piece such as work piece 50. With reference to FIG. 2 it may be observed that work piece 50 is placed within chamber 40. Although work piece 50 includes a mitered edge portion 58, such portion 58 easily finds support from bottom 16 of structural member 12, as well as wall portion 60 of end flange 38. Multiplicity of shims 52 may be placed on either side of work piece 50, FIG. 3, the center work piece 50 on first plurality of bores 22. Of course, work piece 50 may be positioned anywhere along first plurality of bores 22 depending on the arrangement of plurality of shims 52 within chamber 40. Chamber 40 may be formed of any width and length depending on the size of structural member 12. For example, if template 10 was to be used only to produce doweling openings in work piece having a two inch thickness, chamber 40 may be size to accommodate such work piece without use of plurality of shims 52. With respect to FIG. 2, it may also be observed that work piece 50 may be reversed and rest against bottom 16 and inner wall 62 of end flange 62. Drill 64 is then employed to form apertures 64 and 66 in work piece 50. A work piece similar o dissimilar to work piece 50 may be drilled with similar apertures. Apertures 64 and 66 in work piece 50 and the similar apertures in another work piece perfectly align for dowel insertion, used in the eventual joining of such work pieces. Flanges 32, 34, 36, and 38 are easily removed from structural member 12 to accommodate work pieces that do not fit within open chamber 40. For example, FIG. 4 depicts a work piece 64 which is placed against bottom 16 for the drilling apertures 66 and 68. As may be apparent, flanges 32, 34, 36, and 38 have been removed from structural member 12. In addition, second plurality of bores 24 may be employed to drill apertures in work piece 70 which is aligned with plate surface 72, FIGS. 4 and 5, as well side 28 of structural member 12. Thus, second plurality of bores 24 would be available for drill openings in work piece 70. This is especially useful where work piece 70 is a large generally mobile item such as a stud or wall portion found in an edifice. Of course, the second plurality of bores 24 ar used with a another work piece to be fitted by dowels to work piece 70. Template 10 has been found to possess a high degree of versatility to accurately drill doweling apertures in work pieces of all shapes and sizes and degrees of mobility.

While in foregoing, embodiments of the present invention have been set forth in considerable detail for the purposes of making a complete disclosure of the invention, it may be apparent to those of skill in the art that numerous changes may be made in such details without departing from the spirit and principles of the invention.

What is claimed is:

1. A doweling template for a work piece comprising:
   a. a structural member, said structural member including a first set of parallel bores extending through said structural member and a second set of parallel bores orthogonally oriented relative to said first set of parallel bores,
   b. a first guide for aligning a work piece with said first set of parallel bores,
   c. a second guide for aligning a work piece with said second set of parallel bores, and
   d. shim means for selectively fitting a work piece of said first and second guides to and in the alignment with said first, and second set of parallel bores, respectively.

2. The doweling template of claim 1 in which said first guide comprises a first pair of flanges removably fastened to said structural member.

3. The doweling template of claim 2 in which said structural member possesses opposite planar side surfaces substantially parallel to one another.

4. The doweling template of claim 1 in which said structural member is translucent.

5. The doweling template of claim 2 in which said first guide first pair of flanges are translucent.

6. The doweling template of claim 5 in which said structural member is translucent.

7. A doweling template for a work piece comprising:
   a. a structural member, said structural member including a first set of parallel bores extending through said structural member and a second set of parallel bores orthogonally oriented relative to said first set of parallel bores,
   b. a first guide for aligning a work piece with said first set of parallel bores, and
   c. a second guide for aligning a work piece with said second set of parallel bores, said second guide including a plate removably fixed to said structural member.

8. A doweling template for a work piece comprising:
   a. a structural member, said structural member including a first set of parallel bores extending through said structural member and a second set of parallel bores orthogonally oriented relative to said first set of parallel bores,
   b. a first guide for aligning a work piece with said first set of parallel bores, said first guide including a first pair of flanges removably fastened to said structural member, and further including second pair of flanges removably fastened to said structural member, said first pair of flanges being angularly disposed relative to said second pair of flanges, and
c. a second guide for aligning a work piece with said second set of parallel bores.

9. The doweling template of claim 8 in which said first and second pairs of flanges form an open chamber permitting the work piece to contact the structural member at said first set of parallel bores.

* * * * *